(12) United States Patent  
Bang et al.

(10) Patent No.: US 8,976,341 B2
(45) Date of Patent: Mar. 10, 2015

(54) OPTOELECTRIC CONTROL APPARATUS FOR SATELLITE LASER RANGING SYSTEM

(71) Applicant: Korea Astronomy and Space Science Institute, Daejeon (KR)

(72) Inventors: Seung Cheol Bang, Seoul (KR); Hyung Chul Lim, Daejeon (KR); Jong Uk Park, Daejeon (KR)

(73) Assignee: Korea Astronomy and Space Science Instutite, Daejeon (KR)

( * ) Notice: Subject to any disclaimer, the term of this patent is extended or adjusted under 35 U.S.C. 154(b) by 216 days.

(21) Appl. No.: 13/967,204

(22) Filed: Aug. 14, 2013

(65) Prior Publication Data

US 2014/0118717 A1 May 1, 2014

(30) Foreign Application Priority Data

Oct. 31, 2012 (KR) .................. 10-2012-0121893

(51) Int. Cl.
 *G01S 7/484* (2006.01)
 *G01S 17/10* (2006.01)
 *G01S 7/486* (2006.01)
(52) U.S. Cl.
 CPC ............... *G01S 7/484* (2013.01); *G01S 17/105* (2013.01); *G01S 7/4865* (2013.01)
 USPC .......................... 356/5.01; 356/3.01; 356/4.01

(58) Field of Classification Search
 CPC ....... G01S 17/105; G01S 7/484; G01S 7/4865; G01C 3/08
 USPC ............. 356/3.01–3.15, 4.01–4.1, 5.01–5.15, 356/6–22, 28, 28.5
 See application file for complete search history.

(56) References Cited

U.S. PATENT DOCUMENTS

2005/0099637 A1* 5/2005 Kacyra et al. .................. 356/601

* cited by examiner

*Primary Examiner* — Luke Ratcliffe
(74) *Attorney, Agent, or Firm* — Drinker Biddle & Reath LLP

(57) ABSTRACT

An optoelectric control apparatus for a satellite laser ranging system comprises a communication controller for externally receiving optoelectric control data. Memory is connected to the communication controller and stores a round trip distance to a satellite. A laser generation control unit is connected to the communication controller and outputs a laser fire signal. A signal measurement unit receives a laser start time. A real-time conversion unit is connected to the signal measurement unit and the communication controller, and converts a predicted laser arrival time into real time. A Lagrange interpolation processor is connected to the real-time conversion unit and the memory, and calculates a time at which laser light fired by a laser transmission unit returns back to a laser reception unit (laser arrival time). The clock unit is connected to a time measurement unit, the real-time conversion unit, a register unit, and a delay unit, and outputs time information.

4 Claims, 9 Drawing Sheets

OPTOELECTRIC CONTROL APPARATUS FOR SATELLITE LASER RANGING SYSTEM

CROSS-REFERENCE TO RELATED APPLICATION

This application claims the priority of Korean Patent Application No. 10-2012-0121893, filed Oct. 31, 2012 in the Korean Intellectual Property Office, which is incorporated herein by reference in its entirety.

FIELD OF THE INVENTION

Embodiments relate to an optoelectric control apparatus for a satellite laser ranging system.

BACKGROUND

A satellite laser ranging system denotes a system for measuring a distance to a satellite using laser, and is configured to fire laser light with a short pulse width at a satellite and calculate the distance to the satellite using the time of departure (start) of the laser light, which is the time at which the laser light is fired, and the time of arrival (stop) of the laser light, which is the time at which the laser light, after being reflected by the satellite, arrives at a receiver.

Generally, when laser light is fired at a satellite, the start time of the fired laser light is measured using a high-speed photodiode.

In order to measure the arrival time of the laser light, a received light detection unit (photodetector) for measuring light received after being reflected by the satellite is used.

Since the intensity of light, that is, laser light, reflected by the satellite, is weak, the photodetector may be implemented using a Compensated Single Photon Avalanche Diode (C-SPAD) capable of detecting even a single photon.

Such a C-SPAD has sensitive photon detection performance and is capable of driving a gate in accordance with a time point at which light reflected by the satellite arrives at a location of measurement, receiving a laser signal reflected by the satellite, and precisely measuring the arrival time of the laser signal, thus exactly calculating the distance to the satellite.

In order to drive a gate signal for the C-SPAD, the arrival time of laser light is predicted using an optoelectric control apparatus included in the satellite laser ranging system. The optoelectric control apparatus generates a gate signal for the C-SPAD at the predicted time point.

The optoelectric control apparatus is configured using a personal computer (PC) and an optoelectric interface card installed in the PC. The arrival time of laser light reflected by the satellite is calculated using the PC, and the results of the calculation are transferred to the optoelectric interface card. The optoelectric interface card then generates a gate signal for the C-SPAD using the results of the calculation.

Since an optoelectric signal is generated using the optoelectric interface card, information about the arrival time of laser light reflected by the satellite is calculated by the central processing unit (CPU) of the computer and is transferred to the optoelectric interface card through a slot formed in the optoelectric interface card. Thereafter an optoelectric control signal is generated by the optoelectric interface card.

External signals and data, such as the start time of the laser light and the arrival time of the laser light, calculated by the satellite laser ranging system, are transferred to the computer through the optoelectric interface card. In contrast, signals and data generated by the CPU of the computer are also transferred in real time through the optoelectric interface card.

The CPU of the computer processes the data transmitted through the optoelectric interface card.

Data processing is performed in real time by the satellite laser ranging system using the high-performance CPU installed in the computer, thus improving convenience. However, an interface card for the transmission of signals and data between the computer and the satellite laser ranging system is required.

With a variation in the performance of the computer, the transfer rate and configuration method of the interface card are varied, and so an Operating System (OS) and development software are varied, thus causing the problem of maintenance required for the operation of a satellite laser ranging system that uses a commercial computer in the field.

A power supply device currently being used in a commercial computer in a satellite laser ranging system that requires high-speed signal processing causes the problem of producing unnecessary noise in the satellite laser ranging system.

SUMMARY

The invention has been made keeping in mind the above problems occurring in the prior art, and an embodiment implements an optoelectric controller without using a computer.

Another embodiment configures an optoelectric controller that accurately measures the start time of laser light.

Another embodiment configures an optoelectric controller that controls the gate of a C-SPAD by accurately predicting the arrival time of laser light.

An embodiment provides an optoelectric control apparatus for a satellite laser ranging system. An optoelectric controller enables Lagrange interpolation to be performed using an integer calculation method by configuring data in the form of a Next Day Flag (NDF), Second Of Day (SOD), and Picosecond (PSC) and configuring a variable binary selector subsequent to calculators in order to predict and calculate the time of arrival of laser light reflected by a satellite which is required for the optoelectric controller, and so an independent optoelectric controller has been configured in a single semiconductor device. In order to compensate for an error in the measurement time of a precise time measurement device which uses the signal delay of a semiconductor, an error correction device using a conversion table is installed, so that the arrival time (stop time) of laser light is accurately predicted to control the gate of a C-SPAD, thus enabling information received from a satellite to be exactly received.

BRIEF DESCRIPTION OF THE DRAWINGS

The above and other embodiments, features and advantages of the invention will be more clearly understood from the following detailed description taken in conjunction with the accompanying drawings, in which.

DETAILED DESCRIPTION

Figure 1:
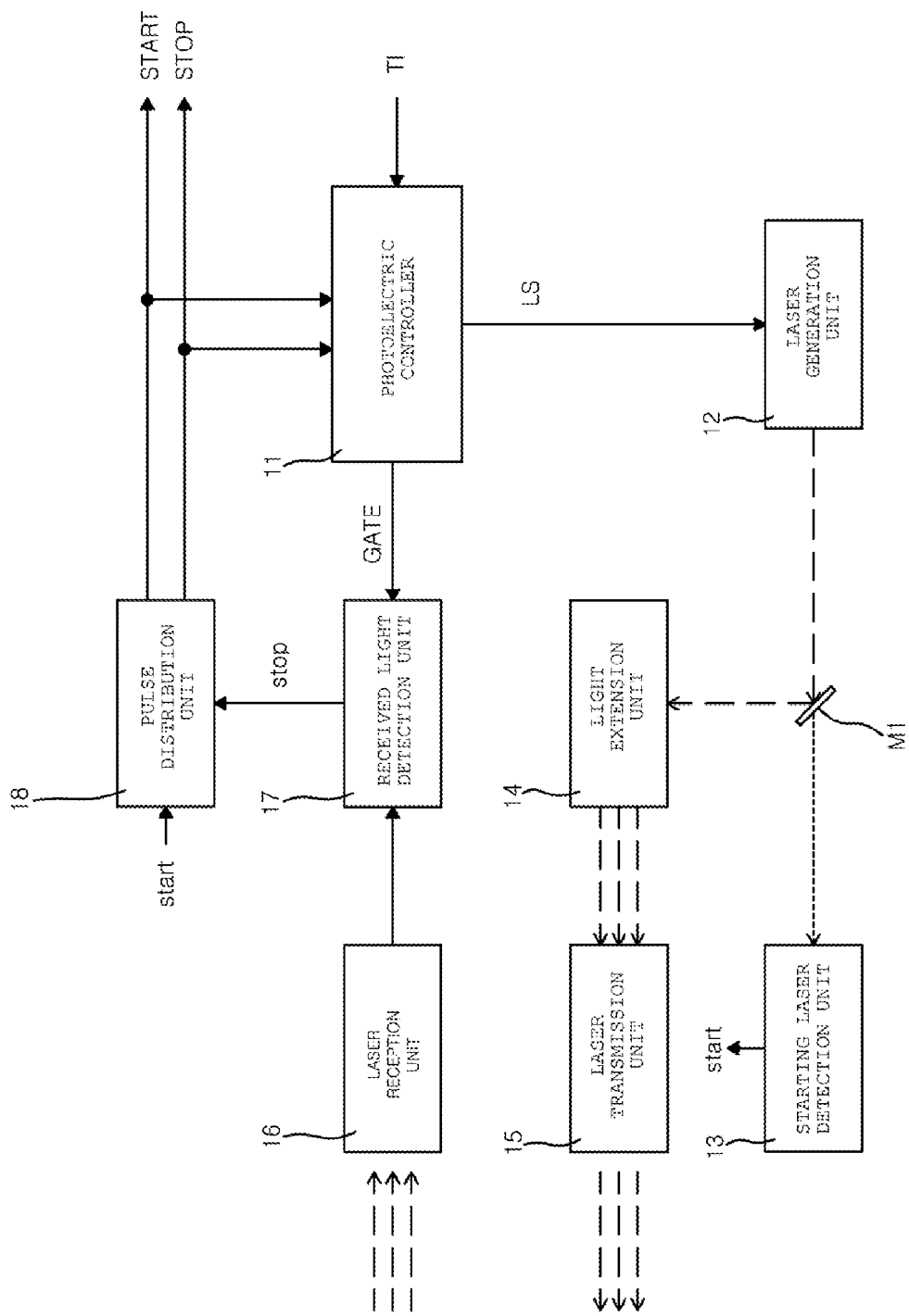
FIG. 1 is a block diagram showing a satellite laser ranging system according to an embodiment of the invention.

Embodiments will be described in detail with reference to the attached drawings so that those skilled in the art will be able to easily implement the invention. The invention may be implemented in various forms and is not limited to specific embodiments described here. The illustration and description of components irrelevant to the description of the invention are omitted in the drawings so as to clearly describe the invention. The same reference numerals are used throughout the different drawings to designate the same or similar components.

A satellite laser ranging system according to an embodiment of the invention will be described in detail with reference to the attached drawings.

Referring to FIG. 1, a satellite laser ranging system comprises an optoelectric control unit 11, a laser generation unit 12, a mirror M1, a starting laser detection unit 13, a light extension unit 14, a laser transmission unit 15, a laser reception unit 16, a received light detection unit 17, and a pulse distribution unit 18. The optoelectric control unit 11 receives a laser departure (start) time (START), a laser arrival time (STOP), and time information (TI), and outputs a laser fire signal (LS) and a gate signal (GATE) for a Compensated Single Photon Avalanche Diode (C-SPAD). The laser generation unit 12 is connected to the optoelectric control unit 11 and configured to fire laser light in response to the laser fire signal. The mirror M1 allows part of the laser light output from the laser generation unit 12 to pass therethrough and the remaining part of the laser light to be reflected therefrom. The starting laser detection unit 13 outputs the start time of the laser light, that is, a laser start time (start), using the laser light having passed through the mirror M1. The light extension unit 14 receives the laser light reflected by the mirror M1 and extends the received laser light. The laser transmission unit 15 transmits laser light output from the light extension unit 14 to a satellite. The laser reception unit 16 receives laser light reflected by the satellite. The received light detection unit 17 outputs the arrival time of the laser light, that is, a laser stop time (stop), using the laser light received by the laser reception unit 16. The pulse distribution unit 18 is connected to the starting laser detection unit 13, the received light detection unit 17, and the optoelectric control unit 11 and is configured to receive the laser start time (start) input from the starting laser detection unit 13 and the laser stop time (stop) input from the received light detection unit 17 and to output the received laser start time (START) and the received laser stop time (STOP) to the optoelectric control unit 11.

Figure 2:
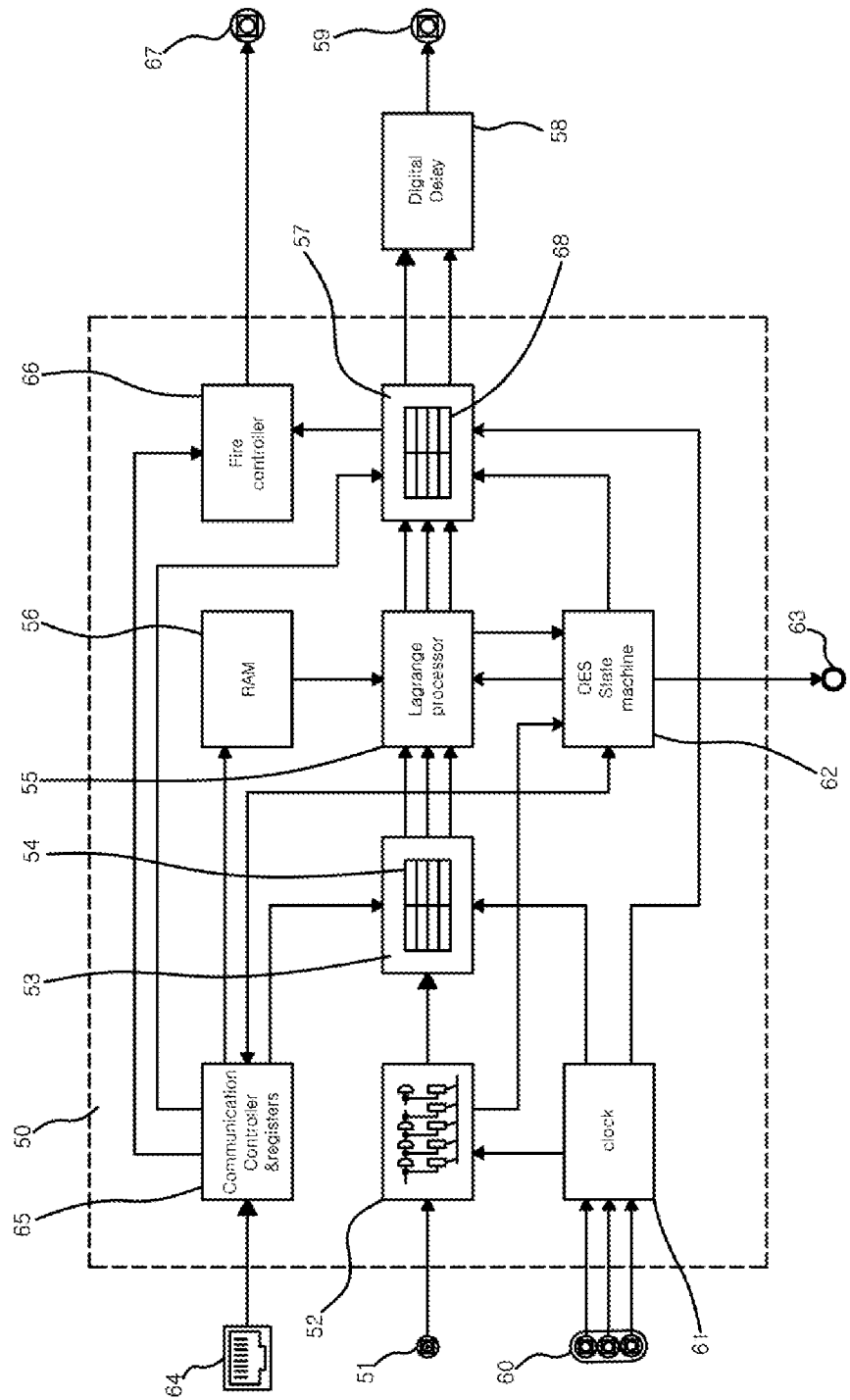
FIG. 2 is a configuration diagram showing an optoelectric control apparatus according to an embodiment of the invention.

As shown in FIG. 2, the optoelectric control unit 11 (hereinafter also referred to as an "optoelectric control apparatus 50") comprises a communication controller 65 for receiving optoelectric control data from the outside of the optoelectric control unit 11; Lagrange interpolation memory 56 connected to the communication controller 65; a laser fire controller 66 connected to the communication controller 65 and configured to output a laser fire signal (LS); a laser start signal measurement unit 52 for receiving the laser start time (START); a laser start signal real-time conversion unit 53 connected to the laser start signal measurement unit 52 and the communication controller 65; a Lagrange interpolation processor 55 connected to the laser start signal real-time conversion unit 53 and the Lagrange interpolation memory 56; a state controller (OES state machine) 62 connected to the communication controller 65, the laser start signal measurement unit 52, and the Lagrange interpolation processor 55; an output real-time conversion unit 57 connected to the communication controller 65, the laser fire controller 66, the Lagrange interpolation processor 55, and the state controller 62; a delay generator (digital delay) 58 connected to the output real-time conversion unit 57; and an internal clock unit 61 configured to receive time information (TI), and connected to the laser start signal measurement unit 52, the laser start signal real-time conversion unit 53, and the output real-time conversion unit 57.

Figure 3:
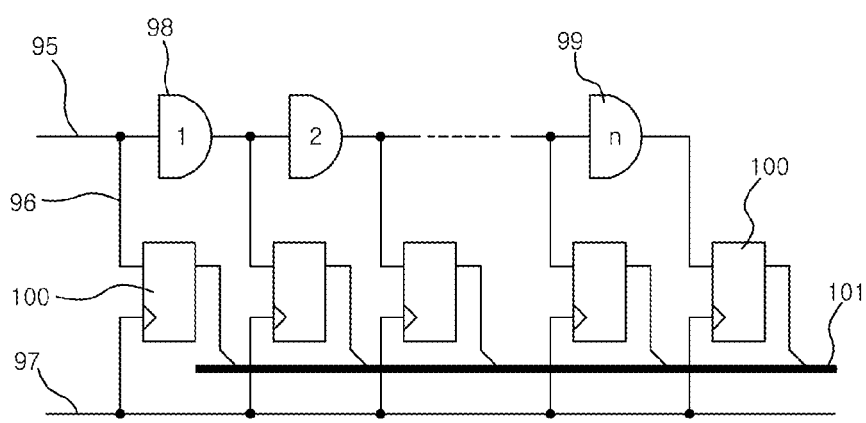
FIG. 3 is a circuit diagram showing a laser start signal measurement unit according to an embodiment of the invention.

As shown in FIG. 3, the signal measurement unit 52 comprises a plurality of semiconductor delay elements 98 configured to receive a laser start time (START) 95 through an input terminal and connected in series with each other, and a plurality of flip-flops 100 connected in parallel with the semiconductor delay elements.

The laser start time (START) is input to the input terminal of a flip-flop 100 located at the head of the flip-flops 100 and the input terminals of the remaining flip-flops 100 are connected in series with the output terminals of the respective semiconductor delay elements 98.

The output terminals of all of the flip-flops 100 are connected to one another and are then connected to the input terminal of the real-time conversion unit 53, and the clock terminals of the flip-flops 100 are also connected to one another and are configured to receive a clock signal 97.

Figure 5:
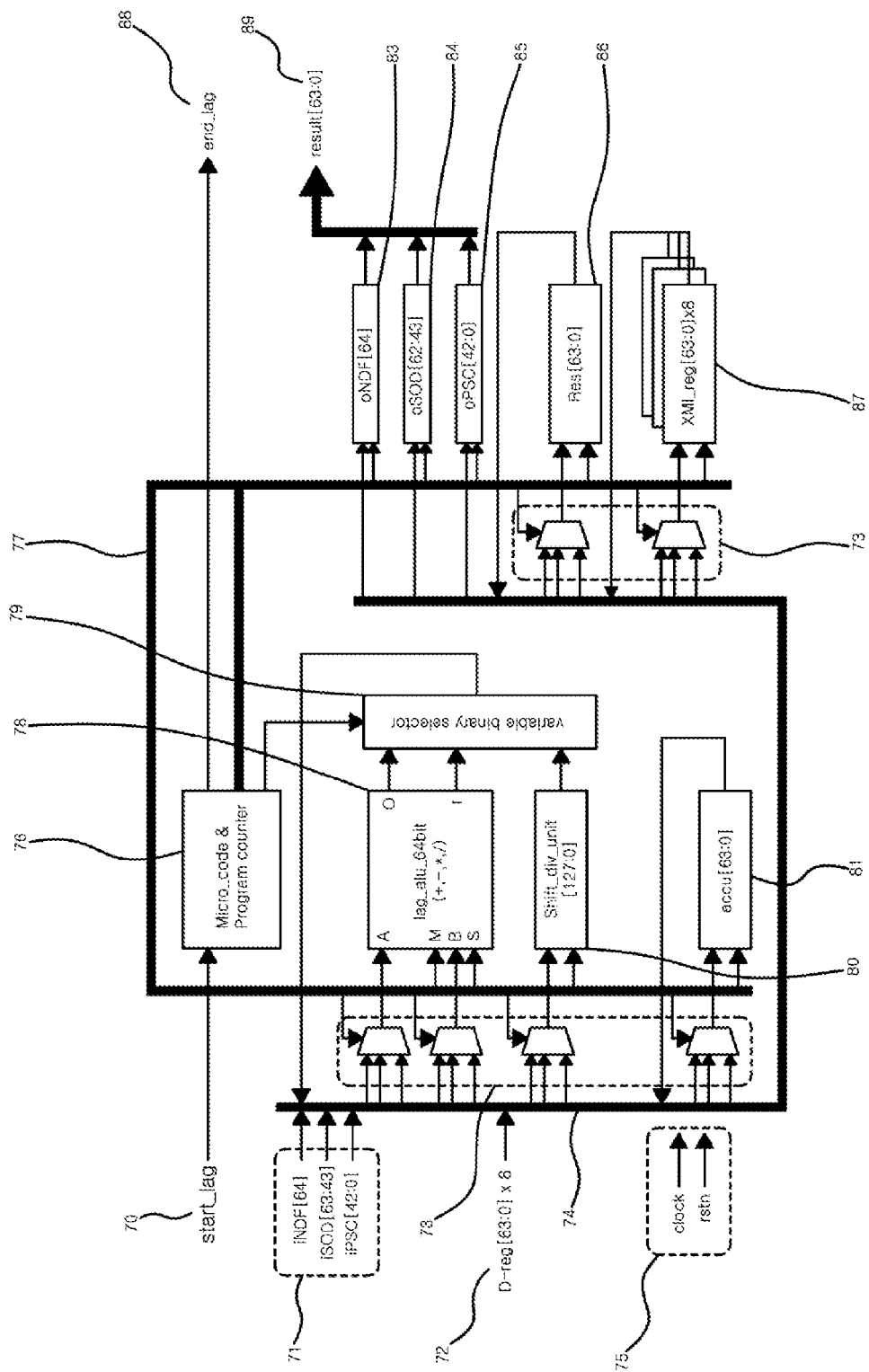
FIG. 5 is a configuration diagram showing a Lagrange interpolation processor according to an embodiment of the invention.

The Lagrange interpolation processor 55 of FIG. 5 comprises a Lagrange controller (micro_code & program counter) 76 connected to the state controller 62 of FIG. 2 and a data bus 74; a data selector 73 connected to the data bus 74; a 64-bit calculator 78 connected to the data selector 73 and the data bus 74; a 128-bit divider 80 connected to the data selector 73 and the data bus 74; an accumulator 81 connected to the data selector 73 and the data bus 74; a variable binary selector 79 connected to the Lagrange controller 76, the 64-bit calculator 78, and a control signal bus 77; an output day change flag (oNDF: output Next day Flag) 83, an output second-unit storage register (oSOD: output Second Of Day) 84, and an output picosecond-unit storage register (oPSC: output Picosecond) 85, which are connected to the data bus 74 and a data bus 89 connected to the output real-time conversion unit 57; an intermediate result storage register 87 connected to the data bus 74 and the data selector 73; and a calculation result temporary storage register 86 connected to the data bus 74 and the data selector 73.

The Lagrange controller 76 generates control signals required for the respective components of the Lagrange interpolation processor 55 and transmits the control signals to the corresponding components through the control signal bus 77.

Through the data bus 74, three types of data, iNDF, iSOD, and iPSC, output from the laser start signal real-time conversion unit 53, and a round-trip distance to the satellite, stored in the Lagrange interpolation memory 56, are applied, and are then transferred to the data selector 73.

The data selector 73 is individually connected to calculation parts, respectively implemented as the 64-bit calculator 78, the 128-bit divider 80, and the accumulator 81, and is used to select required data. The calculation result temporary storage register 86 and the intermediate result storage resister 87 also have their own data selectors so as to select required data. Each data selector 73 is implemented using a multiplexer.

The intermediate calculation result storage register 87 stores eight parameters calculated in Lagrange interpolation, and the calculation result temporary storage register 86 stores the results of calculation when Lagrange interpolation is completed for each unit.

The 64-bit calculator 78 performs four fundamental arithmetic operations (addition, subtraction, multiplication, and division) on pieces of 64-bit integer data.

The 128-bit divider 80 performs division on pieces of 128-bit integer data.

The accumulator 81 temporarily stores the results of the calculation by the 64-bit calculator 78 and the 128-bit divider 80.

The variable binary selector 79 selects required digits from the results of the calculation by the 64-bit calculator and the 128-bit divider 80, and transmits the selected digits to the data bus 74.

The overall operation of the satellite laser ranging system will be described in detail below with reference to FIGS. 1 and 2.

When the optoelectric controller 11 receives a command from the communication controller 65, the laser fire controller 66 outputs a laser fire signal LS to the laser generation unit 12. The laser generation unit 12 generates a laser beam in response to the application of the laser fire signal LS, and outputs the laser beam to the mirror M1. Part of the laser beam reflected toward the mirror M1 is reflected by the mirror M1 and is applied to the light extension unit 14, and the remaining part of the laser beam passes through the mirror M1 and is then applied to the starting laser detection unit 13.

The starting laser detection unit 13 converts the applied laser beam into an electrical signal, generates a laser start time (start), and outputs the laser start time to the pulse distribution unit 18.

The diameter of the laser beam reflected by the mirror M1, that is, the diameter of light, is increased by the light extension unit 14 having a light extender, and the laser beam, the diameter of which has been increased, is transferred to the laser transmission unit 15.

The laser transmission unit 15 is a light transmission optical system composed of at least one mirror and a lens, and fires the applied laser beam at the satellite.

The laser beam fired at the satellite is reflected toward a firing position by a reflector (not shown) mounted on the satellite.

The laser beam reflected by the reflector of the satellite is applied to the laser reception unit 16.

The laser reception unit 16 is a reception optical system composed of at least one mirror and a lens, and the laser beam reflected and returned from the satellite is condensed by the laser reception unit 16. The condensed light is output to the received light detection unit 17.

The received light detection unit 17 is implemented as a C-SPAD.

When a gate signal GATE for the C-SPAD is input from the optoelectric control unit 11, the gate of the C-SPAD of the received light detection unit 17 is opened. When laser light is received, the gate of the C-SPAD is closed.

When the gate is closed, the laser beam transmitted from the laser reception unit 16 is not received any more.

The received light detection unit 17 detects the laser beam received from the laser reception unit 16 only during the application of the gate signal GATE for the C-SPAD, converts the laser beam into an electrical signal, generates a laser arrival time (STOP), and outputs the laser arrival time (STOP) to the pulse distribution unit 18.

Since the gate signal (GATE) for the C-SPAD is used to control the operation of opening or closing the gate of a part at which the received light detection unit 17 receives the laser beam, it may be the gate control signal of the received light detection unit 17.

The received light detection unit 17 may be implemented using the C-SPAD having excellent reception sensitivity to such an extent as to detect even a single photon, but opens the gate of the C-SPAD only at a desired time point by controlling the gate signal (GATE) for the C-SPAD input from the optoelectric controller 11, thereby detecting the received light.

As a result, the problem of reducing the precision of the laser arrival time (stop) by receiving unnecessary surrounding light can be prevented.

The pulse distribution unit 18 receives the laser start time (start) and the laser arrival time (stop), respectively output from the starting laser detection unit 13 and the received light detection unit 17, distributes the received times, and outputs a laser start time (START) and a laser arrival time (STOP) to the optoelectric control unit 11.

The operation of the optoelectric control unit 11 that receives the laser start time (START) controls the operation of the received light detection unit 17, and outputs a gate signal GATE for the C-SPAD which will be described with reference to FIG. 2.

As shown in FIGS. 1 and 2, the optoelectric control unit 11 receives the laser start time (START) transmitted from the pulse distribution unit 18, and time information (TI).

The time information (TI) is received as time information transmitted from a global positioning system (GPS) satellite.

Before the operation of the optoelectric control unit 11 starts, the communication controller 65 of the optoelectric controller 11 receives a laser fire command, input from the CPU of the satellite laser ranging system through a terminal, and stores the received information in the Lagrange interpolation memory 56 and an output real-time conversion table 68.

The Lagrange interpolation memory 56 stores a round trip distance to the corresponding satellite (hereinafter referred to as a 'satellite round trip distance') and a round trip time so as to perform Lagrange interpolation, and the output real-time conversion table 68 stores various parameters required for operations.

When the operation of storing, that is, writing, data corresponding to the Lagrange interpolation memory 56 and the output real-time conversion unit 57 is completed by means of the operation of the communication controller 65, the laser fire signal LS which is a signal for laser firing is generated by the laser fire controller 66, and is then output through a terminal 67.

The laser fire signal LS is applied to the laser generation unit 12 through the terminal 67, and then the laser generation unit 12 outputs the laser beam to the mirror M1.

If the laser start time (START) generated by the starting laser detection unit 13 based on the operations of the mirror M1 and the starting laser detection unit 13 is output through the pulse distribution unit 18, the laser start time (START) is applied to the laser start signal measurement unit 52 of the optoelectric control unit 11.

The laser start signal measurement unit 52 calculates the delay time of the laser start time (START) which is an input signal for a reference clock by using a clock, which is input from the signal input terminal 51 and is required for the measurement of the signal delay of the semiconductor elements and precise signals, as the reference clock, and generates signal delay information from the delay time.

The signal delay information measured by the laser start signal measurement unit 52 is transferred to the real-time conversion unit 53.

When the laser start time (START) is input, the laser start signal measurement unit 52 outputs state information, indicating that the laser start time (START) has been input, to the state controller 62.

The laser start signal real-time conversion unit 53 converts the input laser start time (START) into a real time by using the signal delay information input from the signal measurement unit 52, delay values, and precise time input from the internal clock unit 61.

The precise time, output from the internal clock unit 61, uses time information (TI) transmitted from the GPS satellite.

Figure 4:
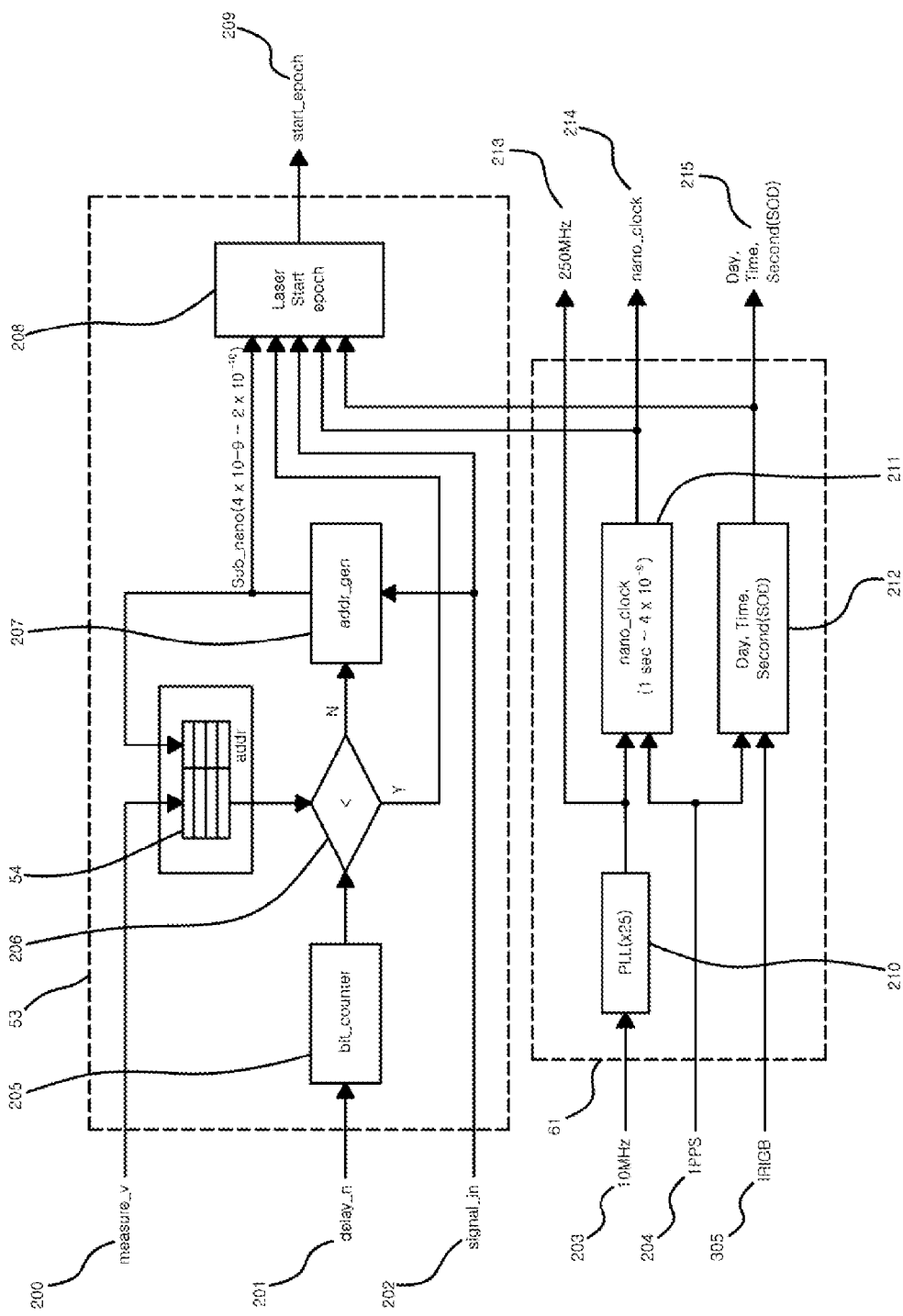
FIG. 4 is a configuration diagram showing a precise time measurement circuit according to an embodiment of the invention.

In order to compensate for irregularity in the signal delay values of respective elements and lines in the method in which input signals use the signal delay of the semiconductor, the laser start signal real-time conversion unit 53 has therein a laser start signal conversion table 54 as a compensation table (see FIG. 4).

The real-time conversion unit 53 accurately and precisely compensates for the laser output time delayed by a time corresponding to the signal delay information calculated by the laser start signal measurement unit 52, using a current time, by using the separately provided compensation table as well as using the time information received from the GPS satellite.

A method of correcting an error related to a difference in signal delay will be described in detail with reference to FIGS. 3 and 4.

When a time error related to the laser start time (START) occurring due to the signal delay is compensated for by the laser start signal real-time conversion unit 53, and an accurate laser start time is calculated, such laser start time information is input to the Lagrange interpolation processor 55.

The Lagrange interpolation processor 55 calculates a time at which the laser light fired by the laser transmission unit 15 of the satellite laser ranging system returns back to the laser reception unit 16, that is, a preliminary gate signal (GATE') for the C-SPAD, using both the accurate laser start time (START) input from the laser start signal real-time conversion unit 53 and a round trip time to an object desired to be measured (for example, a satellite), the round trip time being stored in the Lagrange interpolation memory 56.

The operation of the Lagrange interpolation processor 55 will be described in detail with reference to FIGS. 5 and 6.

The output real-time conversion unit 57 generates the preliminary gate signal (GATE') for the C-SPAD at actual accurate time using laser arrival time information calculated and output by the Lagrange interpolation processor 55. The preliminary gate signal (GATE') for the C-SPAD, output from the output real-time conversion unit 57, is applied to the delay generator 58 (digital delay), and the delay generator 58 outputs a gate signal (GATE) for the C-SPAD at the actual accurate time using the precise time output from the internal clock unit 61.

When state information, indicating that laser start time (START) has been input, is received from the laser start signal measurement unit 52, the state controller 62 determines that a current state is a state in which the laser start time (START) has been input, outputs an operation start signal to the Lagrange interpolation processor 55, and causes the operation of the Lagrange interpolation processor 55 to be initiated.

Further, the Lagrange interpolation processor 55 is configured to, if its own operation, that is, the operation of calculating the preliminary gate signal (GATE') for the C-SPAD, has been completed, generate operation completion state information and output it to the state controller 62.

The state controller 62 outputs an operation start signal to the output real-time conversion unit 57 after the operation completion state information has been input from the Lagrange interpolation processor 55, thus allowing the operation of the output real-time conversion unit 57 to be initiated.

Time points at which the Lagrange interpolation processor and the output real-time conversion unit 57 are to be operated are determined by the state controller 62.

The state controller 62 may individually output operation start signals to the Lagrange interpolation processor 55 and to the output real-time conversion unit 57 after respective designated times at which state information indicative of a state in which laser start time (START) has been input and state information indicative of a state in which the operation of the Lagrange interpolation processor has been completed are respectively input.

If necessary, a display unit, such as a Light Emitting Diode (LED), may be connected to the state controller 62 to externally display the current operation state of the optoelectric controller 11 (63).

Figure 7:
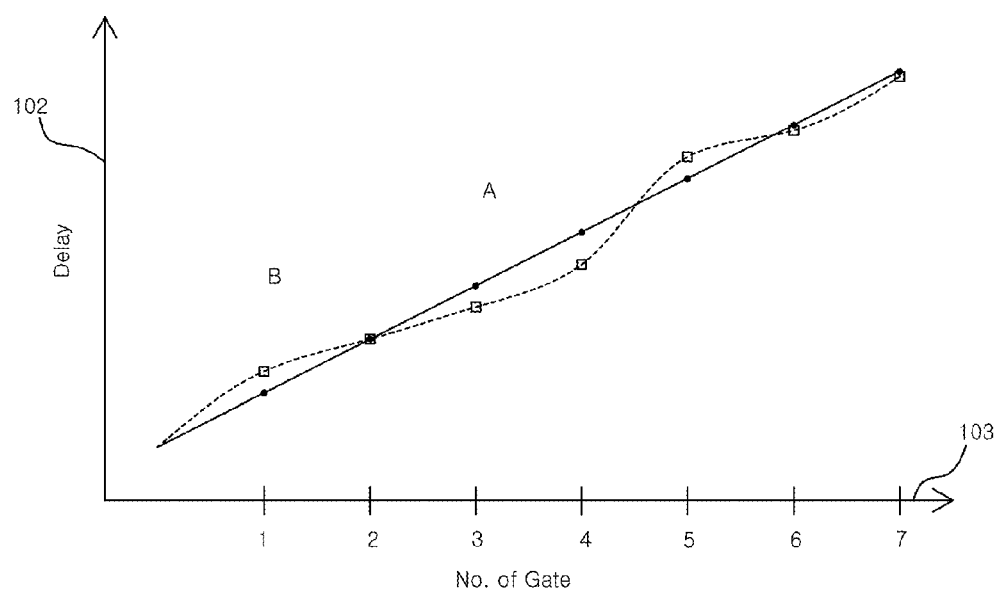
FIG. 7 is a graph showing a variation in the amount of signal delay caused by a difference between the lengths of semiconductor connection lines of a signal measurement unit according to an embodiment of the invention.

A precise time measurement method will be described in detail with reference to FIGS. 3, 4, and 7. As shown in the drawings, the laser start signal measurement unit 52 comprises a plurality of semiconductor delay elements 98 which are delay elements, and a plurality of flip-flops 100.

The input laser start time (START) is divided into two parts, one being applied to the series-connected semiconductor delay elements 98 and being delayed through the series-connected semiconductor delay elements 98, and the other being transferred to the parallel-connected flip-flops 100 and configured to store the state thereof.

The storage of signals is performed such that whenever the pulse of a reference signal is input and applied to the respective clock terminals of the flip-flops 100, the delay values of delayed signals which are input to the semiconductor delay elements of respective stages are output through the output terminals 101 of the respective flip-flops.

In FIG. 3, the lengths of the input terminals of respective semiconductor delay elements have been illustrated as being identical and the lengths of the input terminals of the respective flip-flops have also been illustrated as being identical. However, when the semiconductor delay elements and the flip-flops are actually implemented as a semiconductor, the lengths of terminals connecting the semiconductor delay elements are not actually uniform, and the lengths of terminals connecting neighboring flip-flops are not uniform, either.

When the number of semiconductor delay elements or the number of flip-flops increases, a difference between the lengths of the terminals is not proportional to the increased number of elements (that is, the number of logical AND circuits or the number of flip-flops). Accordingly, as shown in FIG. 7, the amount of signal delay, occurring as the number of elements increases, irregularly increases like 'B' rather than proportionally increasing like 'A.'

Theoretically, the amount of signal delay must appear to be proportional like 'A' according to the number of elements, but, in practice, the amount of delay is not proportional like 'B' due to the difference between the lengths of terminals connecting the elements.

Figure 9:
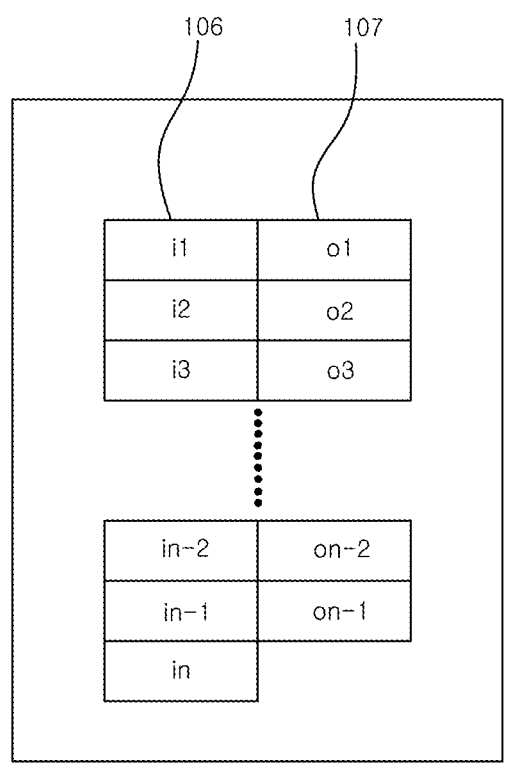
FIG. 9 is a configuration diagram showing a time delay compensation table according to an embodiment of the invention.

In order to solve this problem, an embodiment provides a compensation table 54 required to compensate for irregular signal delays occurring due to the difference between the lengths of terminals which is configured in the real-time conversion unit 53, as shown in FIG. 9.

In FIG. 9, such a compensation table is implemented as memory, such as typical Random Access Memory (RAM).

As shown in FIG. 9, in first blocks 106, the range of values to be measured is stored, and in second blocks 107, converted values are stored. The number of second blocks 107 is less than that of first blocks 106 by one block.

Data stored in the second blocks 107 indicates representative values between pieces of data of the neighboring first blocks 106, and then the number of the second blocks 107 is less than that of the first blocks 106. For example, o1 is configured to have an intermediate value between i1 and i2.

Values stored in the second blocks 107 are configured to store values obtained by measuring delay values using a precise time generation device and a precise time measurement device after the apparatus has been developed.

FIG. 4 is a circuit diagram showing a circuit for precisely measuring the time of a laser start signal in the optoelectric controller. This circuit is composed of a laser start signal real-time conversion unit 53 and an internal clock unit 61.

The internal clock unit 61 provides precise time used in the optoelectric controller. In order to provide precise time, three signal lines are input to the optoelectric controller.

A 10 MHz signal line 203 is a signal line having a precision of $1 \times 10^{-7}$ sec and is input from a GPS receiver or the like provided outside the controller.

A signal input through this signal line is used as a time reference signal for signals within the optoelectric controller. This signal is frequency-converted into a 250 MHz signal 213 using a Phase-Locked Loop (PLL) 210 within the internal clock unit 61.

The converted frequency signal is a 250 MHz signal and exhibits a precision of $4 \times 10^{-9}$ sec. A 1 Pulse Per Second (PPS) signal 204 and an Inter-Range Instrumentation Group-B (IRIGB) signal 305 are also input to the precise clock.

The 1 PPS signal is a 1-second unit signal. The 10 MHz signal is a continuously input signal having a constant magnitude, and indicates a second-unit time using 1 PPS because it can indicate a precise time of up to $1 \times 10^{-7}$ sec, but cannot identify second-unit times.

The IRIGB signal 305 is an amplitude modulated (AM) signal having time information, output from the GPS receiver or the like, and indicates day, time, and Second Of Day (SOD).

Since it is difficult to use the AM signal in the optoelectric controller without change, the AM signal is converted into a Pulse Width Modulated (PWM) signal before being input to the optoelectric controller, and then the PWM signal is input to the optoelectric controller.

An IRIGB decoder 212 in the precise clock separates a PWM IRIGB signal into day, time, and SOD.

This time information is separated into seconds, wherein such second-unit information separation is performed using the 1 PPS signal.

The 250 MHz signal output from the PLL 210 is restored into information having a precision of $4 \times 10^{-9}$ sec by a nano_ clock decoder 211.

A laser start time (start) is input to the laser start signal measurement unit 52 for measuring a start time using the signal delay of semiconductor. When the delay of the input signal with respect to the reference signal is measured, delayed signals 201 are input to the laser start signal real-time conversion unit 53.

A bit counter 205 in the laser start signal real-time conversion unit 53 counts the number of delayed signals with respect to the reference signal, and then generates digital data of the delayed signals.

A signal compensation table (see FIG. 9) is memory for storing precise converted values obtained after having undergone several trials and errors. After the circuit has been configured using these converted values, a precise signal is generated using a precise signal generation device, and the converted values are obtained by digitizing differences between the precise signal and the signals of the circuit while time is being measured using the circuit.

The converted values are stored again in the signal compensation table and are used to compensate for differences between laser start signals that are input in real time.

The real-time restoration of starting laser light is initiated by a signal_in 202 which is a recognition signal for starting laser light.

When this signal is input, the address generator 207 of the memory of the compensation table generates a first address.

This address causes first memory data of the compensation table to be output. The value of this memory data is compared with the number of delay signals, obtained by converting the output of the bit counter 205 into digital signals. When the memory data value of the compensation table is less than the number of delay signals, the address of the compensation table is increased, and a subsequent value of the compensation table is compared with the number of delay signals.

When the value of the compensation table is greater than the number of delay signals, comparison is stopped, and the address value at this time is a value indicative of a precision of $2 \times 10^{-10}$ sec. A laser start epoch configuration element 208 generates the final precise time information 209 of the starting laser light using day, time, and SOD information which is the time information of the precise clock, a precision signal of $4 \times 10^{-9}$ sec, and precision time information of $2 \times 10^{-10}$ sec which is the address of the compensation table.

The operation of the Lagrange interpolation processor will be described in detail with reference to FIGS. 2 and 5.

When an operation start signal 70 required for the operation of the Lagrange interpolation processor 55 is input from the state controller 62 to the Lagrange interpolation processor 55, the Lagrange controller 76 generates control signals (signals of FIG. 8) required for the Lagrange interpolation processor 55, and outputs the control signals to the corresponding components, respectively, through the control signal bus 77.

Figure 8:
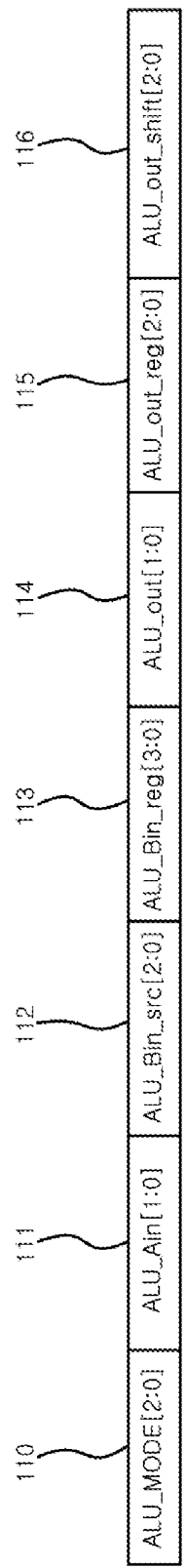
FIG. 8 is a configuration diagram showing a signal output from a Lagrange interpolation controller as a control signal according to an embodiment of the invention.

The format of the control signals output from the Lagrange controller 76 is shown in FIG. 8.

In FIG. 8, the format of the control signals output from the Lagrange controller 76 may be composed of 3-bit ALU_MODE 110, 2-bit ALU_Ain 111, 3-bit ALU_Bin_src 112, 4-bit ALU_Bin_reg 113, 2-bit ALU_out 114, 3-bit ALU_out_reg 115, and 3-bit ALU_out_shift 116.

The ALU_MODE 110 is a code for designating the operations of a 64-bit calculator 78 and a 128-bit divider 80 provided in the Lagrange interpolation processor 55.

The ALU_Ain 111 is a signal for a selector for selecting data that is to be input to the A input port of the 64-bit calculator 78.

The ALU_Bin 112 is a signal for a selector for selecting data that is to be input to the B input port of the 64-bit calculator 78, and is a code for selecting one from among various data blocks (71, 72, 81, 86, and 87 of FIG. 5).

The ALU_Bin_reg 113 is a code for selecting a lower register from the selected block.

The ALU_out 114 is a code for selecting one from among the blocks (71, 72, 81, 86, and 87 of FIG. 5) at which output data will arrive.

The ALU_out_reg 115 is a code for selecting a lower register from the selected block.

The ALU_out_shift 116 is a code for selecting required digits from calculation results after calculation has been performed, and is transferred to the variable binary selector 79.

The Lagrange controller 76 of the Lagrange interpolation processor 55 outputs suitable codes according to the required calculation, thus performing Lagrange interpolation.

The laser start time (START) output from the laser start signal real-time conversion unit 53 is input to be divided into three types (iNDF[64], iSOD[63:43], and iPSC [42:0]).

As described above, iNDF denotes a flag indicative of a change in the day.

The satellite laser ranging system is a device operated in synchronization with standard time, that is, time information TI transmitted from the GPS satellite.

When the day is changed, the satellite laser ranging system may be operated.

In the past there was a need to stop the optoelectric controller, change various types of parameters based on the change of the day, and then reactivate the satellite laser ranging system.

In an embodiment, the iNDF flag is designated in data at a time point at which the day is changed, and so the apparatus is configured to automatically generate time information based on the change of the day.

The iSOD is data indicative of Second of Day (SOD), and is generated by the clock unit 61 in the optoelectric control apparatus 50.

The iPSC is information having a precision of $1 \times 10^{-12}$ seconds below a second unit and is generated using a picosecond time measurement clock 208.

The satellite round trip distance, which is input from the memory 54, is input to a D-reg[63:0] port 72.

These three types of signals (iNDF[64], iSOD[63:43], and iPSC[42:0]) and the satellite round trip distance are transferred to the corresponding components, such as calculators and registers, through the data bus 74.

In order to process a distance to an artificial satellite or the moon as data in [ps], a 64-bit floating point calculation is required, but 64-bit floating point calculation makes the structure of a circuit for performing this calculation complicated and requires a lot of calculation time.

In an embodiment, data is converted into an integer form, and the variable binary selector 79 uses an integer data calculation without using a floating point calculation, and so required digits are selected from the results of calculation of the 64-bit calculator 78 and the 128-bit divider 80, thus greatly reducing calculation time and simplifying the structure of the system.

The results of calculation of the 64-bit calculator 78 and the 128-bit divider 80, which are transmitted to the data bus 74 through the variable binary selector 79, are temporarily stored in the accumulator 81.

After internal calculation has been completed, the results of calculation are output to the outside 89 of the Lagrange interpolation processor 55, with the calculation results being separated into an oNDF 83, an oSOD 84, and oPSC 85. When the output has been completed, a signal 88 indicating that calculation has been completed is output to the outside of the Lagrange controller 55.

Figure 6:
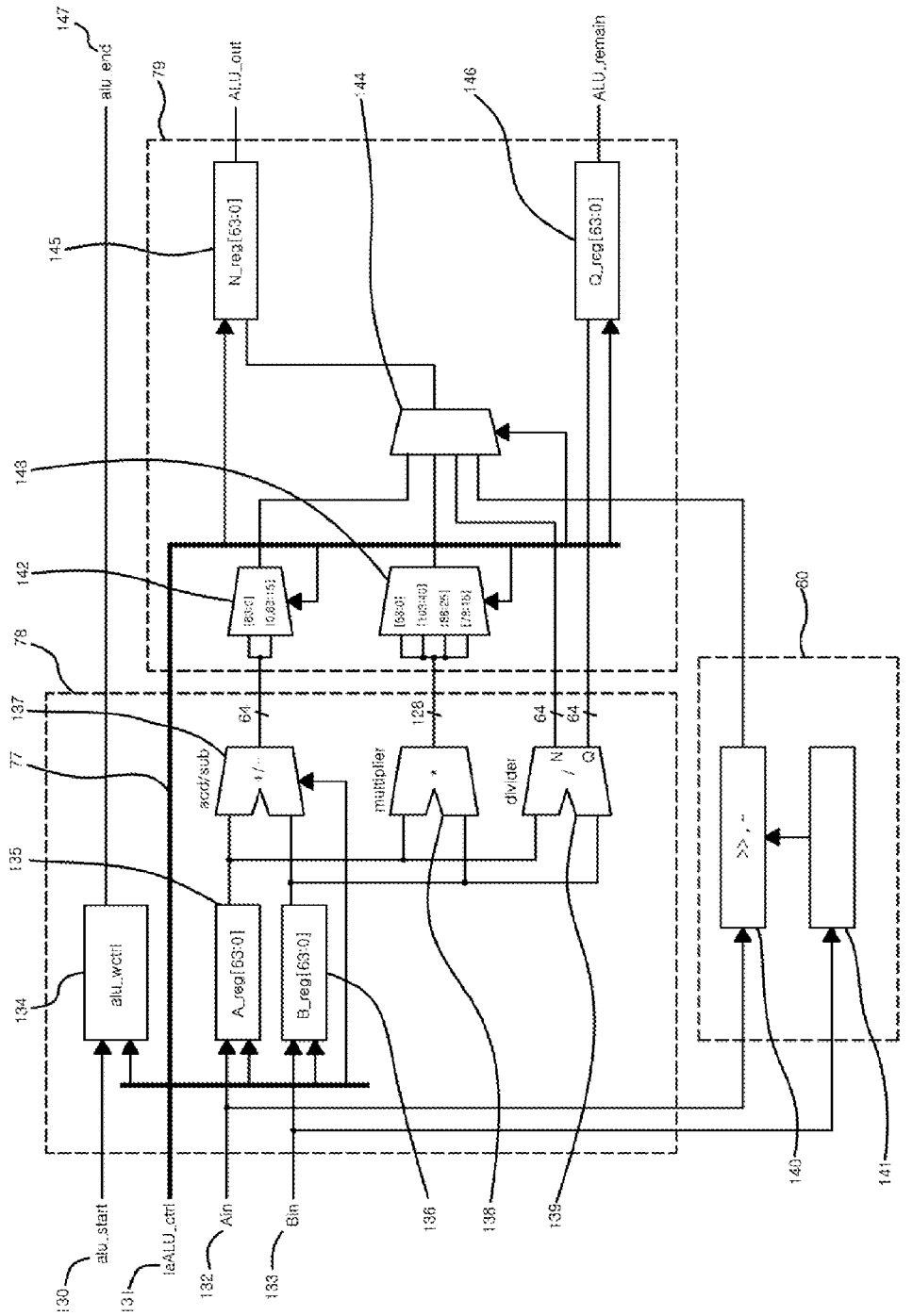
FIG. 6 is a configuration diagram showing the arithmetic element of the Lagrange interpolation processor according to an embodiment of the invention.

FIG. 6 is a configuration diagram showing the arithmetic element of the Lagrange interpolation processor. This block performs an integer arithmetic operation in the Lagrange interpolation processor.

The arithmetic element comprises a 64-bit four-fundamental arithmetic operation block 78, a 128-bit divider 80, and a variable binary selector 79 which are three lower blocks. The 64-bit four-fundamental arithmetic operation block 78 is composed of three arithmetic elements 137, 138, and 139, a signal flow controller 134, and two registers 135 and 136.

The adder/subtractor 137 performs addition/subtraction on pieces of 64-bit integer data. The adder/subtractor 137 performs an arithmetic operation on two 64-bit integer data inputs, and outputs a 64-bit resulting value.

The multiplier 138 performs a multiplication on pieces of 64-bit integer data. After an arithmetic operation on two 64-bit integer data inputs has been performed, a 128-bit resulting value is output. The divider 139 performs a division on pieces of 64-bit integer data.

After the arithmetic operation on two 64-bit integer data inputs has been performed, a 64-bit quotient and a 64-bit remainder are output as a result of the arithmetic operation. Before the 64-bit arithmetic operation is performed, two integers are stored in 64-bit registers A_reg 135 and B_reg 136, respectively.

If the storage of the integers has been completed and an arithmetic operation start command 130 is applied, the corresponding arithmetic operation is initiated. After the arithmetic operation has been completed, a calculator delay circuit 134 outputs an arithmetic operation completion signal 147.

The 128-bit divider 80 is an arithmetic element used to calculate Lagrange coefficients. Since a large error occurs in the calculation of Lagrange coefficients using the 64-bit divider 139, the 128-bit divider 80 is separately configured so as to compensate for such an error, thus minimizing the error.

The 128-bit divider 80 is composed of a 128-bit shift register/subtractor 140 and a 64-bit register 141 for a denominator.

The variable binary selector 79 takes the results of the four-fundamental arithmetic operation block in a previous stage using a binary selection method. In a typical operation, a value is multiplied or divided by a multiple of upon performing calculations, but it is difficult to process multiples of 10 in a semiconductor without change.

The invention is intended to simplify calculations in such a way as to form an input value into integer data by multiplying the input value by $2^{40}$, that is, 1099511627776, upon starting the calculation of input data, and divide a resulting value by $2^{40}$, which was multiplied before calculation, upon taking the results of calculation after the calculation has been completed.

Binary division is performed using selectors 142 and 143. Binary division using the selectors is advantageous in that high-speed division can be performed using a simple circuit.

In the configuration of selectors, the results of the adder/subtractor 137 are configured in the form of a two-stage selector ([63:0], [0, 63:15]/32768) and the results of the multiplier are configured in the form of a four-stage selector ([63:0], [103:40]/1099511627776, [86:25]/33554432, [78:15]/32768) in order to minimize loss caused by calculations, without dividing $2^{40}$ which was multiplied in the previous stage at one time.

The configured selectors required for various binary divisions are selected using a method of minimizing loss in calculations. After calculations have been completed, an operation selector 144 selects results and stores the selected results in result storage registers 145 and 146. The results of four fundamental arithmetic operations are stored in N_reg 145, and the remainder of the calculation results of the divider 139 is stored in Q_reg 146.

An optoelectric controller which is characteristic of the invention enables Lagrange interpolation to be performed using an integer calculation method by configuring data in the form of NDF, SOD, and PSC and configuring a variable binary selector subsequent to calculators without using a computer, and so an independent optoelectric controller has been configured in a single semiconductor device. In order to compensate for an error in the measurement time of a precise time measurement device which uses the signal delay of a semiconductor, an error correction device using a conversion table is installed, so that the arrival time (stop time) of laser light is accurately calculated and predicted to control the gate of a C-SPAD, thus enabling information received from a satellite to be exactly received.

The invention is advantageous in that, when an optoelectric controller is configured, an independent optoelectric controller is configured using a power supply device causing less noise, thus preventing unnecessary noise from occurring in the power supply device currently used in existing computers.

Although preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optoelectric control apparatus for a satellite laser ranging system, comprising:
   a communication controller for externally receiving optoelectric control data;
   memory connected to the communication controller and configured to store a round trip distance to a satellite;
   a laser generation control unit connected to the communication controller and configured to output a laser fire signal;
   a signal measurement unit configured to receive a laser start time;
   a real-time conversion unit connected to the signal measurement unit and the communication controller, and configured to convert a predicted laser arrival time into a real time using a value input from the signal measurement unit and a time applied by a clock unit;
   a Lagrange interpolation processor connected to the real-time conversion unit and the memory, and configured to calculate a time at which laser light fired by a laser transmission unit returns back to a laser reception unit, that is, the laser arrival time, by using an accurate laser start time input from the real-time conversion unit and a round trip time to an object desired to be measured, the round trip time being stored in the memory; and
   the clock unit connected to a time measurement unit, the real-time conversion unit, a register unit, and a delay unit, and configured to output time information, and
   wherein the Lagrange interpolation processor comprises:
      a Lagrange interpolation controller for receiving an operation signal required for operation of the Lagrange interpolation processor and generating a control signal required for the Lagrange interpolation processor;
      a 64-bit adder/subtractor for performing addition/subtraction on pieces of 64-bit integer data;
      a 64-bit multiplier for performing a multiplication on two pieces of 64-bit integer data and outputting a 128-bit resulting value;
      a 128-bit divider for performing a division on pieces of 128-bit integer data; and
      a variable binary selector for selection respective operation results of the 64-bit adder/subtractor and the 64-bit multiplier using a variable binary selection method.

2. The optoelectric control apparatus of claim 1, further comprising a state controller connected to the communication controller, the signal measurement unit, and the Lagrange interpolation processor, and configured to receive laser start time information from the signal measurement unit, and output an operation signal to the Lagrange interpolation processor, thus enabling the Lagrange interpolation processor to be operated.

3. The optoelectric control apparatus of claim 1, further comprising a delay unit for outputting a laser reception signal at an accurate time using the time output from the clock unit, the delay unit being connected to an output real-time conversion unit.

4. The optoelectric control apparatus of claim 1, wherein the real-time conversion unit comprises a signal compensation table for compensating for an irregular signal delay occurring due to a difference between lengths of terminals.

* * * * *